(12) United States Patent
Haendel

(10) Patent No.: US 6,208,289 B1
(45) Date of Patent: Mar. 27, 2001

(54) SYSTEM AND METHOD FOR MONITORING AND REPORTING GPS PSEUDO RANGE CORRECTION DATA

(75) Inventor: Richard S. Haendel, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/311,947

(22) Filed: May 14, 1999

(51) Int. Cl.[7] .................................................. H04B 7/185
(52) U.S. Cl. .............................. 342/357.03; 342/357.06; 701/215
(58) Field of Search ....................... 342/357.03, 357.06; 701/213, 215

(56) References Cited

U.S. PATENT DOCUMENTS

| 5,436,632 | * | 7/1995 | Sheynblat | 342/357 |
| 5,523,761 | * | 6/1996 | Gildea | 342/357 |
| 5,589,835 | * | 12/1996 | Gildea et al. | 342/357 |
| 5,796,365 | * | 8/1998 | Lewis | 342/357 |
| 5,999,878 | * | 12/1999 | Hanson et al. | 701/208 |

* cited by examiner

Primary Examiner—Thomas H. Tarcza
Assistant Examiner—Dao L. Phan
(74) Attorney, Agent, or Firm—Nathan O. Jensen; Kyle Eppele; J. P. O'Shaughnessy

(57) ABSTRACT

A differential GPS receiver system in which a first receiver at a known location generates pseudo range correction data and a second GPS receiver at a nearby second known location uses the data to determine an enhanced calculated position of the second GPS receiver, which is then compared with the known second location. If the enhanced calculated position falls within an acceptable level of error from the known position, then the pseudo range correction data is transmitted to mobile receivers.

20 Claims, 1 Drawing Sheet

SYSTEM AND METHOD FOR MONITORING AND REPORTING GPS PSEUDO RANGE CORRECTION DATA

FIELD OF THE INVENTION

The present invention generally relates to global positioning systems (GPS) and even more particularly relates to differential GPS (DGPS).

BACKGROUND OF THE INVENTION

In the past, designers of avionics navigation systems have endeavored to provide systems with improved abilities to more precisely make location determinations using GPS satellites. One widely accepted approach to enhancing positional resolution for GPS receivers has been the use of differential GPS, which involves using a GPS receiver located at a known fixed location to generate pseudo range correction data, which then is provided to mobile receivers via a data link connection, where it is used to enhance the position determination abilities of the mobile receiver. This method is used widely in commercial airports throughout the world. When DGPS is used for commercial air carriers, it becomes necessary to have a very precise and robust DGPS system. A simple DGPS system provides much enhanced ability to determine position; however, the pseudo range computations made by a single DGPS receiver are not perfect. Numerous sources of errors still exist. Consequently, many airports are using an averaging technique to further reduce the errors present in a single DGPS receiver approach. These airports will place several DGPS receivers, each at a different surveyed location around the airfield, and calculate pseudo range correction data for each location. It is widely believed that many of the errors will be cancelled out and that an average of several, 5 or more, of the pseudo range corrections will be more precise than any single data set.

Another approach that has been used in the past has been to generate pseudo range correction data by a single GPS receiver and a single surveyed antenna.

While these DGPS stations have many advantages, they also have significant drawbacks.

First of all, for the multiple GPS receiver method, the cost of using five or more linked DGPS receivers and the computing equipment used to operate the system, can be very expensive. Secondly, for the multiple GPS receiver method, the position determined from such DGPS stations may have much improved precision. The situation may still exist that the pseudo range correction data sent to the mobile GPS receivers may result in a position determination that fails to meet the necessary precision requirements. For the single GPS receiver and single antenna method, the quality assessment of such a system is very limited, because using the same GPS receiver and the same antenna to confirm quality as to generate the data itself eliminates the ability of detecting errors which are resulting from the receiver and antenna themselves. Consequently, there exists a need for improvement in systems and methods for monitoring and reporting pseudo range correction data.

SUMMARY OF THE INVENTION

It is an object of the present invention to provide enhanced pseudo range correction information.

It is a feature of the present invention to utilize a second GPS receiver at a second known location for using pseudo range correction data produced by a first surveyed GPS receiver at another location.

It is an advantage of the present invention to better determine the quality of the pseudo range correction data being generated by a DGPS station.

It is another feature of the present invention to include a pseudo range data buffer and position error comparison function to determine before transmitting to mobile receivers, if the pseudo range correction data being generated results in a position determination which is within a predetermined acceptable range.

It is another advantage of the present invention to reduce the potential for transmitting pseudo range correction data to an aircraft which would result in a position determination not within the acceptable range.

The present invention is an apparatus and method monitoring and reporting pseudo range correction data for GPS receivers which is designed to satisfy the aforementioned needs, provide the previously stated objects, include the above-listed features and achieve the already articulated advantages. The present invention is carried out in a "high integrity data correction system" in a sense that the uncertainty of the level of quality of the pseudo range correction data being transmitted to mobile receiver has been greatly reduced.

Accordingly, the present invention is a system and method for monitoring and reporting pseudo range correction data to mobile GPS receivers, where the system and method involves using a second GPS receiver at a known location to use pseudo range correction data, generated by a first GPS receiver and antenna, to generate an enhanced position determination and further involves making a determination of the quality of the pseudo range correction data generated by the first GPS receiver, by a comparison of the surveyed position of the second GPS receiving antenna with the enhanced position determination calculated by the second GPS receiver using the pseudo range correction data provided by the first GPS receiver.

BRIEF DESCRIPTION OF THE DRAWINGS

The invention may be more fully understood by reading the foregoing description of the preferred embodiments of the invention, in conjunction with the appended drawing wherein:

The FIGURE is a simplified schematic diagram of a system of the present invention which shows one GPS receiver, with a surveyed antenna, using pseudo range data from another GPS receiver, as a data input.

DETAILED DESCRIPTION

Figure 1:
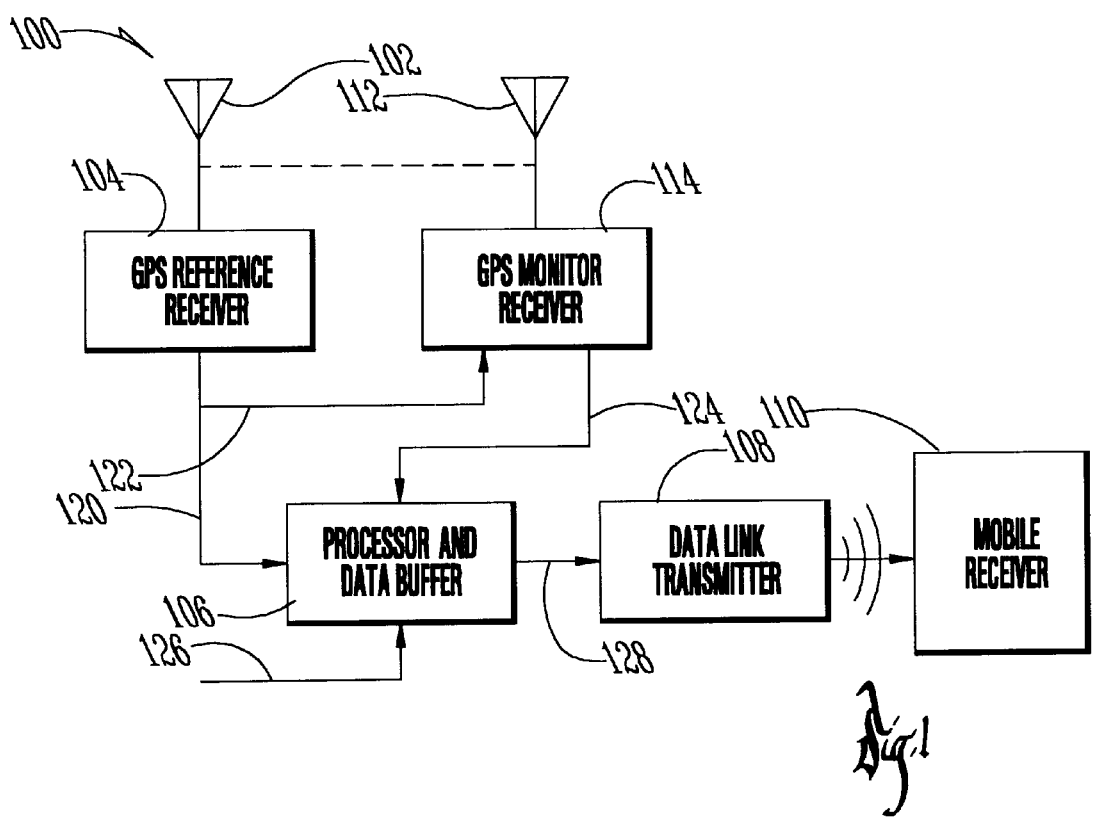

Now referring to the drawing wherein like numerals refer to like matter throughout, there is shown a system of the present invention, generally designated 100, having a first antenna 102, at a known or surveyed first position, which is coupled to a reference GPS receiver or a GPS reference receiver 104. Throughout this document, GPS and DGPS are used as examples of a broader set of position determination schemes which could include, but are not limited to: Glonass, Loran, or any other system which uses or could use a "differential like" method for improving position determination. Reference GPS receiver 104 generates pseudo range correction data, in a manner which is well known in the art, provides such pseudo range correction data on lines 120 and 122 to a processor and data buffer 106 and a monitor GPS receiver 114 respectively. Processor and data buffer 106 may be any device which is capable of performing the necessary computations and comparisons and data storage. Numerous well-known approaches to performing the functions of processor and data buffer 106 could be used. Coupled to line 122 and receiving pseudo range correction data therefrom is monitor GPS receiver or GPS monitor receiver 114, which is well known in the art. Monitor GPS receiver 114 is coupled to second antenna 112 at a second known location. Monitor GPS receiver 114 operates very much like a typical mobile receiver, except that it may receive its pseudo range correction data over a wire instead of a data link connection as is typical for mobile GPS receivers. Monitor GPS receiver 114 generates an enhanced position determination based upon the pseudo range correction data it receives on line 122.

Processor and data buffer 106 receive on line 120 the pseudo range correction data and momentarily stores it. Processor and data buffer 106 further receive on line 124 the enhanced position determination and receive on line 126 the surveyed position of second antenna 112. Processor and data buffer 106 compare the enhanced position determination with the surveyed position and determines whether the difference between them is within an acceptable range. If the difference is acceptable, then the pseudo range correction data generated by reference GPS receiver 104, and buffered by processor and data buffer 106 is passed on, on line 128 to data link transmitter 108 where it is transmitted to mobile receivers 110 in the area. The process is continuously repeated at a predetermined interval, which is a function of the equipment chosen and the type of location system being used. i.e. GPS, Glonass, Loran etc.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A system comprising:

a first receiver coupled to a first antenna, located at a first known location, said first receiver for receiving signals through said first antenna and generating in response thereto, information representative of a difference between said first location and a first computed location;

a second receiver coupled to a second antenna, located at a second, known location, said second receiver for receiving signals through said second antenna and further for receiving said information from said first receiver and generating in response thereto an enhanced position determination of said second antenna; and, a processor for making a comparison of said enhanced position determination of said second antenna with said second location and generating a signal representative of a characteristic of said comparison.

2. A system of claim 1 wherein said first receiver is a GPS receiver.

3. A system of claim 2 further comprising a transmitter coupled to said processor, and responsive to said comparison, for selectively transmitting information representative of said difference.

4. A system of claim 3 wherein said first known location and said second known location are co-located.

5. A system of claim 3 wherein said first antenna and said second antenna share common components.

6. A system comprising:

means for generating pseudo range correction data;

means for generating an enhanced position determination as a function of said pseudo range correction data;

means for making a comparison of said enhanced position determination with a surveyed location; and, means for selectively transmitting said pseudo range correction data as a function of said comparison.

7. A system of claim 6 wherein said means for generating pseudo range correction data is a GPS receiver.

8. A system of claim 7 wherein said means for comparison performs a comparison with respect to a predetermined maximum level of error between said enhanced position determination and said surveyed position.

9. A system of claim 8 wherein said means for generating an enhanced position determination is a GPS receiver.

10. A system of claim 9 wherein said means for selectively transmitting comprises a data link transmitter.

11. A system of claim 6 wherein said means for generating pseudo range correction data is a Glonass receiver.

12. A system of claim 6 wherein said means for generating pseudo range correction data is a Loran receiver.

13. A system of claim 10 wherein said means for selectively transmitting comprises a microprocessor.

14. A method of determining a position of a mobile object comprising the steps of:

receiving a first signal at a first location generating a first correction signal at said first location in response to said first signal;

providing said first correction signal to a second location;

determining a calculated position of said second location in response to said first correction signal;

comparing said calculated position with a predetermined position of said second location and generating a comparison signal; and transmitting said first correction signal to a third location if said comparison signal has a predetermined relationship with respect to a reference.

15. A method of claim 14 further including receiving said correction signal at a third location.

16. A method of claim 15 further including a step of storing said correction signal at a fourth location.

17. A method of claim 16 further including releasing said correction signal in response to said comparison signal.

18. A method of claim 17 wherein said step of receiving a first signal utilizes a GPS receiver.

19. A method of claim 18 wherein said step of determining a calculated position utilizes a GPS receiver.

20. A method of claim 19 wherein said step of storing said correction signal utilizes a data buffer.

* * * * *